Patented May 7, 1940

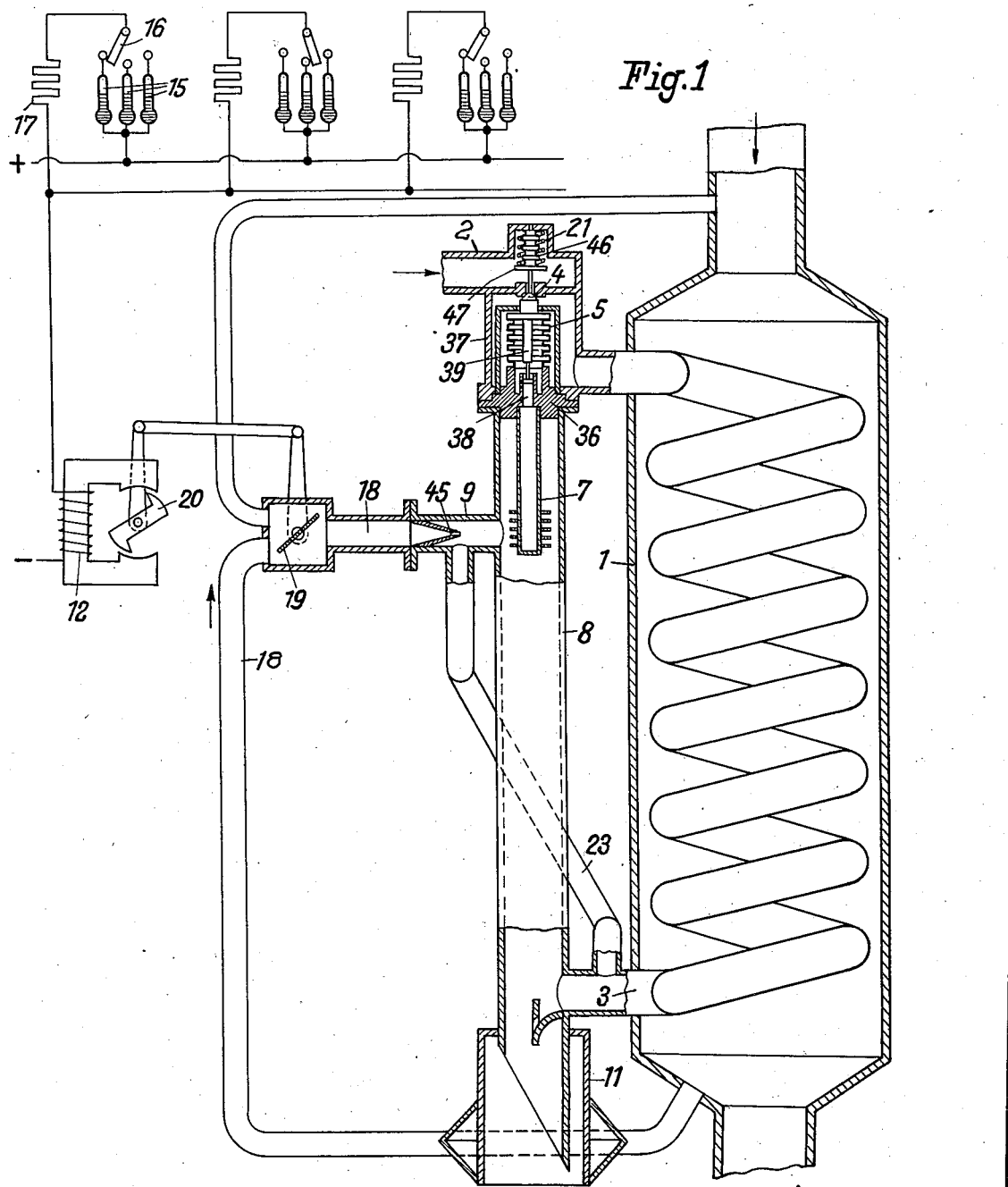

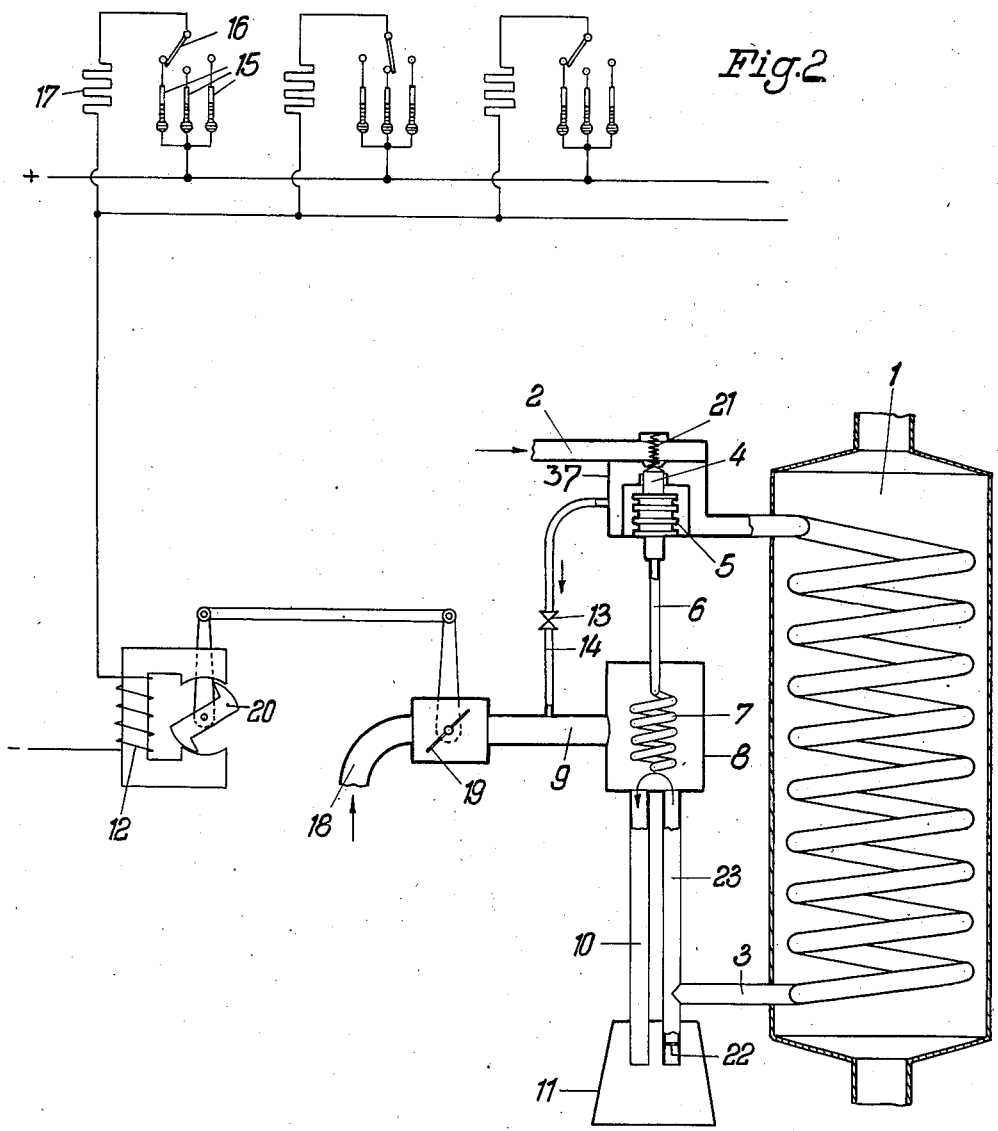

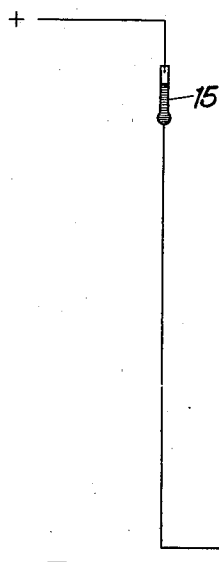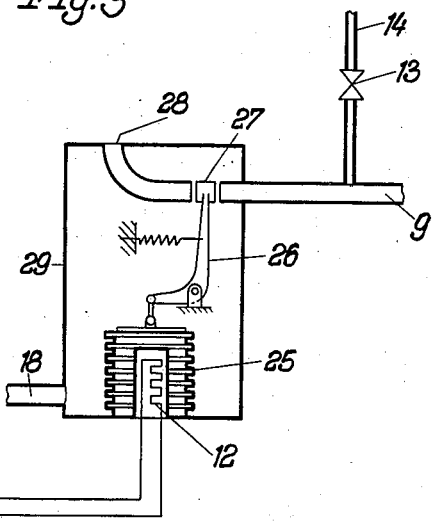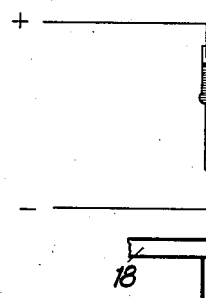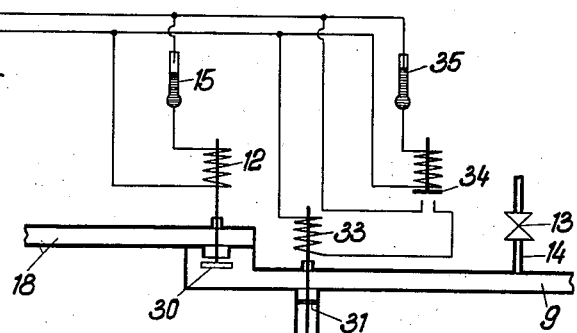

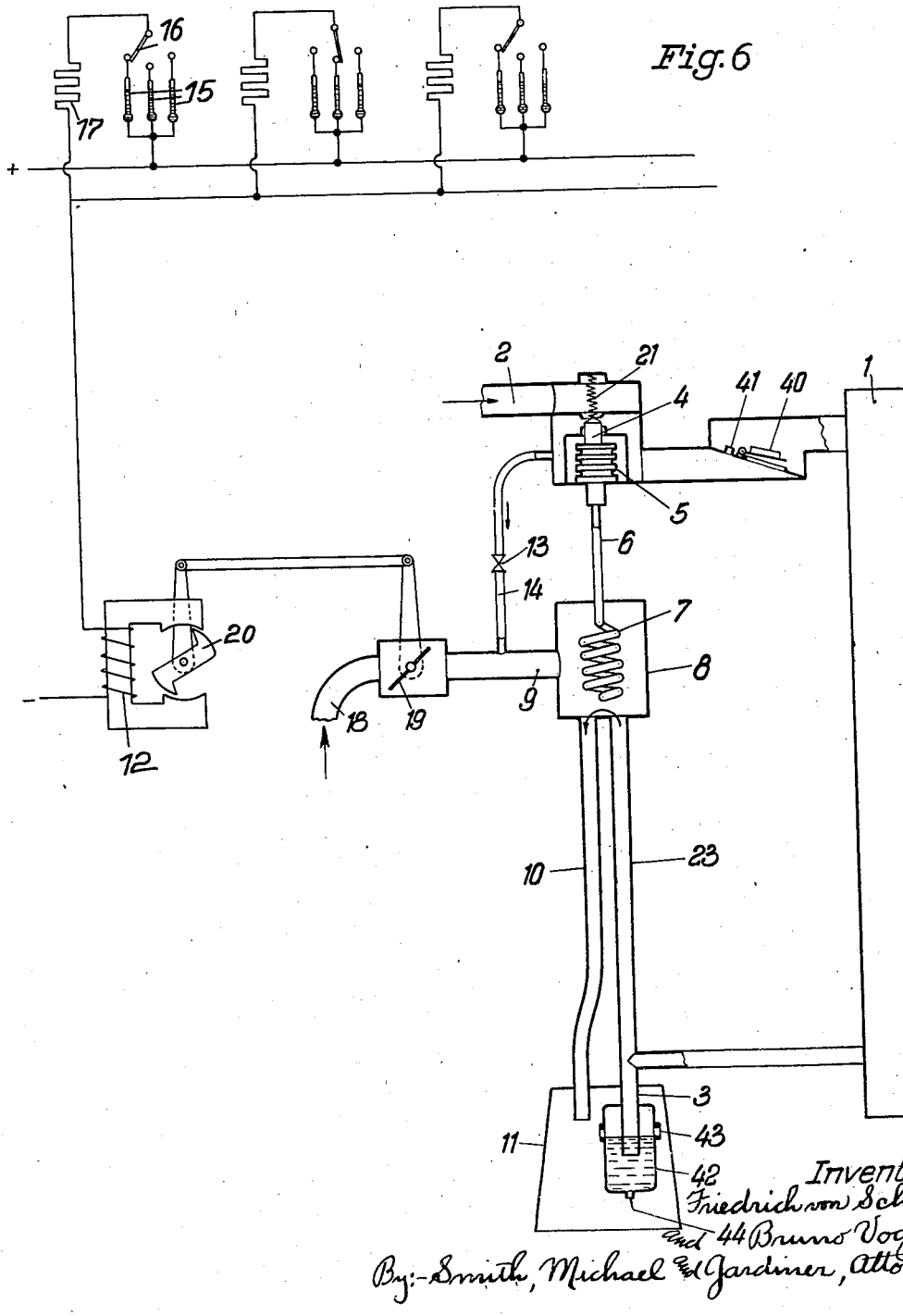

2,199,531

UNITED STATES PATENT OFFICE 2,199,531

AUTOMATIC REGULATING DEVICE FOR AIR HEATING PLANTS IN RAILWAY VEHICLES

Friedrich von Schütz, Berlin-Lichterfelde-West, and Bruno Vogée, Berlin-Wilhelmshagen, Germany, assignors to Julius Pintsch Kommanditgesellschaft, Berlin, Germany Application September 23, 1936, Serial No. 102,194
In Germany October 4, 1935

15 Claims. (Cl. 236—68)

This invention relates to a device for automatically regulating air heating in railroad cars, in which the fresh air prior to entering the car is treated in a heater operated by a heating medium, such as steam, warm water, gases of combustion, or waste gases.

The invention in some respects constitutes an improvement of the regulating device described and claimed in my co-pending application Ser. No. 52,738, filed December 3, 1935, now Patent No. 2,086,452.

In the device according to this former application the supply of heating medium to the air heater is controlled by an inlet valve adjusted by a thermal relay the heating element of which is switched on and thereby causes the closing of the inlet valve if the desired room temperature is exceeded in a certain number of compartments of the car. This is effected by means of a maximum current relay connected in the circuit of the heating element and having its exciting winding traversed by the sum total of the currents switched on by contact makers arranged in the compartments.

The present invention aims at improving this regulating device, in which the inlet valve for the heating medium is throttled if the room temperature is exceeded in a certain number, say, seven of nine, compartments of a car, and gradually completely closed if the impulse given continues long enough, which is usually the case owing to the lagging of the change in room temperature relative to regulation. It is, however, preferable to provide for regulation in such manner that the supply of heating medium, instead of being fully shut off, is throttled to a varying extent, depending on the number of compartments in which room temperature has been reached. In this way, smoother regulation is insured and over-control avoided.

For this purpose, according to the present invention, the thermal relay actuating the valve for the heating medium is not heated electrically, as in the device according to the preceding application, but by means of the heating medium for the air heater, this heating by the heating medium being offset by cooling by means of an air current. Heating with the heating medium can be effected either by bringing the element of the thermal relay that is sensitive to temperature into heat conducting connection with the inlet valve flown through by the heating medium or by having the element surrounded by a branch current of the heating medium. The element is cooled by blowing an air current cooler than the heating medium against it, such as a branch current of the cold air supplied to the air heater or of the warm air coming out of the heater or a mixture of these two branch air currents. The degree of heating and cooling of the sensitive element of the thermal relay and thus the temperature thereof and the position of the inlet valve for the heating medium controlled thereby are varied by changing the amount of the branch current of heating medium playing around the element or the quantity of the air current blowing against it, variation being effected by the actuation of adjusting members in the branch piping of the heating medium or in the piping for blowing air, which are adjusted by contact makers sensitive to temperature and arranged in the compartments.

The use of warm air branched off behind the air heater for blowing against the element sensitive to temperature affords the advantage that the temperature of this air varying with the lift of the valve for the heating medium influences that of the element in the same direction and, with respect to regulation, has the effect and tendency to counteract all variations in the travel of the valve.

By gradually throttling one of the branch currents or both of them it becomes possible in a device of this kind to adjust for instance the steam supply to the air heater at will. This gradual throttling in a car having compartments is effected according to the invention by means of a rotary magnet with the armature of which the adjusting member is coupled and whose exciting winding is flown through by the sum of the currents switched on by the contact makers in the compartments.

According to the invention, the adjusting member or members in the branch conduits may also be actuated by an electrically heated thermal relay the heating resistance or resistances of which are individually or collectively flown through by the currents switched on by the contact makers in the compartments.

If the temperature of only one heated room is to be regulated a single contact maker controlling the heating of the thermal relay will be sufficient. In this instance, the adjusting member in the branch conduit actuated by the rotary magnet or the thermal relay may be replaced by a magnetically actuated valve the excitation of which is switched on and off by a contact thermometer in the heated room. To avoid too sudden actuation of the valve for the heating medium the jacket surrounding the evaporating vessel of the thermal relay and flown through by the mixed current may possess a relatively large mass and be insulated, so that, owing to the necessity of heating and cooling also this jacket, heating and cooling of the evaporating vessel is delayed.

If it is desired gradually to throttle a branch conduit, such as the air branch conduit, a second magnet valve controlling a branching outlet fitted with throttling means may be provided, which is opened by means of a contact thermometer arranged in the heated room and of a cut-out relay if the room temperature exceeds the contact temperature of this thermometer. The temperature of this thermometer is somewhat below that of the thermometer associated with the totally throttling magnet valve, so that during rising of the room temperature at first the air current acting upon the vessel of the thermal relay is reduced to the extent of this branch current and only completely shut off when the room temperature continues to rise further.

If heating of the element sensitive to temperature of the thermal relay is effected by means of a current of the heating medium and not by heat conduction and if regulation is brought about by changing only the amount of the current of blown air, provision is preferably made for preventing any variation in the amount of the branch current of heating medium, apart from a single adjustment of a valve built into the conduit thereof, since a variation thereof would involve a change in the position of the valve for the heating medium, which, however, is exclusively to be caused by the setting of the adjusting member for the warm air branch current effected by the contact makers in the heated room.

For this purpose, the piping supplying heating medium to the air heater is provided behind the branching-off of the branch current of the heating medium serving for acting upon the thermal relay with an in-built overpressure flap opening in the direction of the stream of the heating medium and loaded by weight or spring in such manner that a certain pressure must prevail in the supply piping in front of this flap to cause the opening of the latter. This arrangement prevents, even if the car requires very little heat and consequently very little heating medium or none at all is supplied to the air heater and the inlet valve is almost closed, that in the portion of the supply piping from which the partial current for the thermal relay is branched off pressure drops below a certain limit and the quantity of this current decreases below a certain point.

When steam is used as heating medium for the air heater, the steam inlet valve can be throttled even if the steam is incompletely utilized in the air heater and steam flows out of the condensate outlet. For this purpose, a throttling station is provided in the condensate discharge pipe and in front thereof a conduit is branched off which leads into the jacket surrounding the evaporating vessel of the thermal relay. When steam instead of condensate comes out of the air heater, a portion thereof is forced by throttling to act upon the evaporating vessel of the thermal relay, whereby the steam inlet valve is throttled.

To avoid wide opening of the steam inlet valve in case of very great heat demand of the car and the admission of more steam than is condensed in the air heater, so that much steam comes out of the heater and, owing to the throttling of the steam at the outlet, damming up occurs whose effect extends as far as the space directly behind the steam inlet valve, and, due to the resulting increase in pressure in the supply piping at the point where the branch current for the thermal relay is taken, to prevent any enlargement of the quantity of this current, the invention provides for the replacement of the throttling station in the condensate outlet by an overflow comprising a vessel into which the condensate discharge pipe opens below the level of the water of condensation. Owing to this arrangement, the overpressure of the steam in front of the overflow cannot be greater than the immersion of the pipe, which is kept so low that damming up of the steam at the point of withdrawal of the branch current does not occur.

By way of example, several embodiments of the invention are diagrammatically illustrated in the accompanying drawings, in which Figure 1 shows the regulating device of a steam-heated air heater, wherein the element sensitive to temperature of the thermal relay is heated by heat conduction from the steam inlet valve and is cooled by an air current blown against it, the amount of the current being changed by an adjusting member actuated by a rotary magnet; Fig. 2, the regulating device of a steam-heated air heater, wherein the element sensitive to temperature of the thermal relay is heated by being acted upon by a branch steam current; Fig. 3, an adjusting member in the blower air piping operated by means of a thermal relay; Fig. 4, an adjusting member constructed as magnet valve; Fig. 5, an adjusting member formed of two magnet valves; and Fig. 6, the regulating device shown in Fig. 2 equipped with an overpressure flap in the piping between the steam valve and the air heater and with an overflow vessel disposed on the condensate outlet.

Referring to the drawings, the air heater 1 is supplied with heating steam by the conduit 2, and the condensate passes off through the piping 3. In the live steam supply conduit 2 a steam inlet valve is provided the cone 4 of which is loaded by a spring 21 and connected with the movable bottom of the spring body 5 secured to the lid 36 of the valve box 37. Through a bore 38 in the lid 36, which serves also as guide for the pin 39 attached to the movable bottom of the spring body 5, the inside of the spring body 5 is in communication with the tubular evaporating vessel 7 provided with external ribs at the lower end and containing an evaporable liquid, such as ether.

The evaporating vessel 7 is made of material possessing good heat conductivity and, owing to a heat-conducting connection of the evaporating vessel and of the lid 36 of the valve box 37, the vessel 7 is heated by the steam flowing through the inlet valve.

Into the jacket pipe 8 surrounding the evaporating vessel 7 and secured to the lid 36 opens the supply piping 9 in which the nozzle 45 is inserted. The nozzle 45 directed towards the portion of the evaporating vessel 7 provided with cooling ribs is supplied by the piping 18 with air, such as a branch current of the air coming out of the air heater, the amount of which can be varied by the adjusting member 19. The adjusting member 19, against the action of a return spring not shown, is adjusted by the rotary magnet 20 the exciting winding 12 of which is connected in series with the contact thermometers 15 and the resistances 17 connected in parallel in the compartments of the car. In each compartment three contact thermometers 15 which make contact at different temperatures are arranged of which the one responding to the desired temperature is switched on by a switch 16.

Into the jacket pipe 8 open below and opening into the drain funnel 11 the condensate discharge pipe 3 is laterally introduced whence a conduit 23 leads to the pipe 9, so that steam emerging from the air heater is taken up by the current of blowing air flowing through the nozzle 45 and conducted to the evaporating vessel 7.

The action of the device is as follows:

As soon as heating steam flows through the valve, the evaporating vessel 7 being in heat conducting connection therewith will be heated, so that the liquid contained therein evaporates, the spring body 5 is extended owing to the increase in pressure produced and the valve cone 4 is brought closer to its seat and steam pressure is throttled. This heating by means of the heating steam is counteracted by the cooling effected by the air current blowing against the evaporating vessel 7. Between heating of the vessel 7 by the heating steam and cooling by the current of blowing air a state of equilibrium is brought about, which by dimensioning of the amount of blowing air is so adjusted that the inlet valve at the resulting position of the cone 4 permits the passage of an amount of steam required for heating the air to the desired temperature.

If the temperature in some compartments exceeds the desired degree, the thermometers 15 will make contact therein and close the circuit of the exciting winding 12 by way of the resistances 17. Since the latter are in parallel, the current flowing through the exciting winding 12 will be the higher the more compartments have attained the desired room temperature. The rotary armature of the magnet 20 is drawn against the action of a return spring, not shown, in the direction of the connecting line of the magnet poles and thereby so adjusts the throttle valve 19 coupled therewith that the amount of blowing air supplied through the piping 18 is reduced. The temperature of the evaporating vessel 7 rises, as now heating by the heating steam preponderates, and as a result thereof pressure in the vessel increases and throttles the steam inlet valve 4 to a greater extent. Inversely, if the thermometers 15 open owing to lowering of the room temperature, the excitation of the rotary magnet will be reduced and the throttle valve 19 opened more fully. The enlargement of the amount of blower air reduces again the temperature of the evaporating vessel 7, so that the pressure therein decreases and the steam inlet valve is opened to a larger extent. In this way, automatic gradual regulation of the steam supply to the air heater in dependence upon room temperature is effected.

If the temperature of the heating steam supplied by the conduit 2 rises, the evaporating vessel 7 will be heated correspondingly more by heat conduction and throttling by the valve will increase. By suitable dimensioning of the device and the selection of the liquid contained in the evaporating vessel it is possible to cause variations in the state of the heating steam to be without influence upon the amount of heat supplied to the air heater per time unit.

To prevent the variable pressure of the inflowing live steam from affecting the position of the valve, the valve cone is preferably relieved by arranging within the loading spring 21 a spring body 46 closed below whose inner space is in communication with the outer air and whose bottom is supported by the spring plate 47 of the spring 21. The effective diameter of the spring body 46 is approximately equal to the diameter of the valve seat, so that the steam pressure, acting on two surfaces of equal size, can apply only two equal and oppositely directed forces to the movable portion of the valve, which offset each other.

For cooling the evaporating vessel any medium, such as a branch current of the warm air coming out of the air heater or a mixture of warm and cold air, may be used, provided that the temperature of the evaporating vessel due to blowing this medium against it is lower than the temperature produced by exclusive heating by heat conduction. Particularly suitable is the employment of an air current having outer temperature, for instance of a branch current of the fresh air supplied to the air heater, as then the outer temperature will be decisive also for the position of the steam inlet valve. A pipe for supplying such a branch current of fresh air is shown in Figure 1. The lower the outer temperature the more preponderates cooling of the evaporating vessel 7 by the air current and causes wider opening of the inlet valve, whereas, inversely, at high outer temperature the steam inlet valve will be increasingly throttled.

If excess steam flows through the condensate discharge pipe 3 from the air heater, which easily occurs particularly during heating up, it will be drawn up through the pipe 23 by the blower air current coming out of the nozzle 45 and conducted to the evaporating vessel 7 which will be rapidly heated thereby and cause throttling of the steam inlet valve, so that losses due to incomplete utilization of the steam in the air heater will be avoided.

In the construction shown in Fig. 2 the thermal relay is heated by a branch current of the heating medium, which is branched off from the valve box 37 behind the valve seat and introduced by the conduit 14 containing the valve 13 into the pipe 9 leading to the jacket 8 of the evaporating vessel 7. The evaporating vessel 7 is constructed as a coil closed below, which communicates with the spring body 5 through the conduit 6 and contains an easily evaporable liquid like ether. From the jacket 8 a pipe 10 leads to the drain funnel 11 for discharging the mixture of steam and air entering through the pipe 9. In the condensate discharge piping 3 of the air heater 1 a throttling station 22 is provided and in front thereof a conduit 23 leading to the jacket 8 of the evaporating vessel 7 is branched off.

The device functions in substantially the same manner as that shown in Fig. 1, though the evaporating vessel 7 is heated not by heat conduction but by a branch steam current supplied through the conduit 14.

If steam emerges from the condensate discharge piping 3 owing to incomplete utilization of the heating steam in the air heater 1, a portion thereof will be forced by the throttling station 22 to flow through the conduit 23 to the jacket 8 where it heats the evaporating vessel 7 and causes throttling of the steam inlet valve 4.

The throttling member in the air piping shown in Fig. 3, which in the constructions according to Figs. 1 and 2 replaces the throttle valve 19, is actuated by a thermal relay the heating element 12 of which is connected in the same manner as the exciting winding 12 of the magnet in the construction shown in Fig. 1 if the steam supply to an air heater is to be regulated which has to provide several compartments with heating air. If, however, only one room is to be heated, only a contact thermometer 15 exposed to the room temperature is arranged in the circuit of the heating element, as indicated in Fig. 3.

The movable wall of this thermal relay is formed of the spring body 25 which actuates the double valve 27 by means of the bell crank 26. The valve 27 at one end position shuts off the mixing piping 9 and opens the outlet 28, so that the air entering through the conduit 18 the casing 29 surrounding the spring body passes into the atmosphere; when in its other end position, the valve closes the outlet 28 and opens the mixing piping 9 to cause air to flow through the piping 9 into which opens also the steam supply pipe 14 to the jacket 8 of the thermal relay controlling the steam inlet valve. Here, too, a strong current flowing through the heating element 12 reduces the amount of blown air and thereby throttles the steam inlet valve 4 while a weaker current or current failure increases the amount of blown air and thus opens the steam inlet valve 4. The provision of the thermal relay in the casing 29, i. e., in the air stream which owing to the outlet 28 is maintained even if the piping 9 is shut off, shortens the transit time of the thermal relay if a branch current of the warm air coming out of the air heater serves as blowing air.

According to Fig. 4 the adjusting member in the air conduit is constructed in the form of a magnet valve 30 in the exciting circuit of which the contact thermometer 15 disposed in the heated room is connected and which shuts off the air current when excited. To avoid too sudden closing of the steam inlet valve 4 it is advisable to prolong in this construction the time for heating up or cooling the thermal relay 5, 6, 7, which may be done for instance by providing the jacket 8 with thick walls and insulating it.

Soft regulation can also be effected by providing in the air piping 18, besides the magnet valve 30, an outlet with a throttle 31 and controlled by a magnetic valve 32, as shown in Fig. 5. The exciting winding 33 of the valve 32 is cut out by a relay 34 when the thermometer 35 exposed to room temperature makes contact. The contact temperature of the thermometer 35 is slightly, e. g. 1°, below that of the thermometer 15 arranged in the exciting circuit of the magnet valve 30.

If the room temperature is below the contact temperature of the thermometer 35 and thus also below that of the thermometer 15, the valve 30 will be open and the valve 32 closed, so that the entire amount of air flowing through the conduit 18 passes into the mixing pipe 9. If the temperature in the heated room rises, first the thermometer 35 will make contact and thus open the valve 32 through which a portion of the air flows outside, so that the jacket 8 will be supplied with less air and the vessel 7 will be heated more. Should the room temperature still continue to rise, the thermometer 15 will also make contact and the valve 30 completely shut off the air current. The thermal relay 5, 6, 7 the evaporating vessel of which is acted upon only by the steam flowing through the conduit 14 will therefore be increasingly heated and throttle the steam inlet valve still more.

In the construction shown in Fig. 6 the live steam piping 2 leading to the air heater 1 is provided behind the inlet valve 4 and the branching of the conduit 14 with an overpressure flap 40 which opens in the direction of the flow of steam. The flap 40 is loaded by a weight in such manner that in the portion of the piping arranged in front thereof a certain minimum pressure must prevail which opens it. In the partition of the overpressure flap a small overflow opening 41 is provided.

The condensate discharge piping 3 opening into the draining funnel 11 is surrounded by an overflow vessel 42 the lateral overflow openings of which are so arranged that the piping 3 immerses to a certain extent in the condensate collecting in the vessel 42. At the bottom of the latter a narrow outlet opening 44 is provided for permitting outflow of the condensate when heating is stopped and thereby preventing freezing of the overflow.

These two devices function as follows:

The overpressure valve 40 prevents the pressure of the steam at the point of withdrawal of the branch current flowing through the conduit 14 and thus the amount of current from exceeding a certain minimum value at low heating output, so that the amount of this branch current remains practically unchanged even at low loading of the heating and regulation is not disturbed. Even when the car requires no heat, the steam inlet valve is not fully shut off but always permits the passage of an amount of steam sufficient to maintain the steam inlet valve in its heavily throttling position by acting on the evaporating vessel 7. This slight amount of steam protects the pipe 10 leading to the draining funnel 11 against freezing. The small overflow opening 41 takes care that always some steam is supplied to the air heater 1 to prevent freezing thereof and especially of the condensate discharge pipe 3 which is particularly exposed to this danger. Owing to the arrangement of the overflow vessel 42 on the condensate discharge pipe 3, the pressure of the steam on leaving the heater cannot exceed an amount fixed by the degree of immersion in the vessel 42. In this manner, the risk of an accumulation of pressure at the condensate outlet and of a reaction thereof with respect to the point of withdrawal of the branch current flowing through the conduit 14 is effectively eliminated, the amount of this branch current being upwardly limited by the same means.

By dimensioning the load of the overpressure flap 40, which may be varied by attaching weights or altering the setting of a loading spring, as well as by controlling the immersion of the overflow 42 at the condensate discharge one is therefore enabled upwardly or downwardly to limit changes in steam pressure at the point of withdrawal of the branch current 14, due possibly to a very slight or very great heating output, in such manner that a variation of this branch current affecting regulation does not occur.

We claim:

1. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, and means for automatically varying the cooling of the vaporising vessel by the air in dependence upon the temperature of the car.

2. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, connected with the spring body and in heat-conducting connection with the heating medium valve, a vaporising liquid in the vaporising vessel, a jacket surrounding the vaporising vessel, a feed pipe for supplying a branch current of the heating air to the jacket, a discharge pipe extending from the jacket into the atmosphere, and means for automatically varying the cooling of the vaporising vessel by the air in dependence upon the temperature of the car.

3. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, connected with the spring body, a vaporising liquid in the vaporising vessel, a jacket surrounding the vaporising vessel, a conduit branching off from the heating medium piping behind the valve for supplying a branch current of heating medium to the jacket, a piping for supplying a branch current of the heating air to the jacket, a discharge pipe extending from the jacket into the atmosphere, and means for automatically varying the cooling of the vaporising vessel by the air in dependence upon the temperature of the car.

4. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a piping for conducting to the jacket a branch current of the heating air emerging from the air heater, a discharge pipe extending from the jacket into the atmosphere, and means for automatically varying the cooling of the vaporising vessel by the air in dependence upon the temperature of the car.

5. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a piping for conducting to the jacket a branch current of the heating air supplied to the air heater, a discharge pipe extending from the jacket into the atmosphere, and means for automatically varying the cooling of the vaporising vessel by the air in dependence upon the temperature of the car.

6. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, pipings for supplying to the jacket a branch current of the heating air emerging from the air heater and a branch current of the heating air supplied to the air heater, a discharge pipe extending from the jacket into the atmosphere, and means for automatically varying the cooling of the vaporising vessel by the air in dependence upon the temperature of the car.

7. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, an adjusting member in the air pipe extending to the jacket, and means for automatically controlling the adjusting member in dependence upon the temperature of the car.

8. A device for automatically regulating the supply of heating medium to the air heater of an air-heating plant for a railway car provided with compartments, comprising a valve in the piping which supplies heating medium to the air heater, a thermal relay for controlling the valve, said relay comprising a spring body for actuating the valve, a vaporising vessel, connected with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, an adjusting member in the piping supplying air to the jacket, a rotary magnet having a rotary armature and an exciting winding, said rotary armature being operatively coupled with the adjusting member, and a contact thermometer and a resistance connected in series therewith in each of the compartments of the car, the said contact thermometers and resistances in the compartments all being connected in parallel to one another and in series with the exciting winding of the rotary magnet.

9. A device for automatically regulating the supply of heating medium to the air heater of an air-heating plant for a railway car provided with compartments, comprising a valve in the piping which supplies heating medium to the air heater, a thermal relay for controlling the valve, said relay comprising a spring body for actuating the valve, a vaporising vessel, connected with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, an adjusting member in the piping supplying air to the jacket, comprising a casing provided with an outlet, a supply pipe and a discharge pipe for the air flowing through, a double valve for the alternate closing of the outlet and of the discharge pipe, a spring body, a vaporising liquid in said spring body and an electric heating element in said spring body, a contact thermometer and a resistance connected in series therewith in each of the compartments of the car, said contact thermometer and resistance in the compartments all being connected in parallel with one another and in series with the electric heating element.

10. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, an adjusting member in the pipe supplying air to the jacket, comprising a casing provided with an outlet, a supply pipe and a discharge pipe for the air flowing through, a double valve for the alternate closing of the outlet and of the discharge pipe, a spring body, a vaporising liquid in said spring body, an electric heating element in said spring body, and a contact thermometer in the heated car, which is connected in series with the electric heating element.

11. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, a magnetically controlled valve provided with an exciting winding in the piping supplying air to the jacket, and a contact thermometer in the heated car, which is connected in series with the exciting winding of the magnetically controlled valve.

12. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, a magnetically controlled valve provided with an exciting winding in the piping supplying air to the jacket, a contact thermometer in the heated car, which is connected in series with the exciting winding of the magnetically controlled valve, an outlet in the air supply piping, arranged behind the magnetically controlled valve, a throttle in the said outlet, an outlet valve provided with an exciting winding and disposed in the said outlet, a cut-out relay provided with an exciting winding and in series with the exciting winding of the outlet valve, and a second contact thermometer in the heated car, the operating temperature of the said second thermometer being below that of the thermometer connected in series with the exciting winding of the magnetically controlled valve, the second contact thermometer being connected in series with the exciting winding of the cut-out relay.

13. A device for automatically regulating the supply of heating medium to the air heater of an air-heating plant in a railway car, comprising a valve in the piping which supplies heating medium to the air heater, a thermal relay for controlling the valve, said relay comprising in combination a spring body for actuating the valve, a vaporising vessel, connected with the spring body, a vaporising liquid in the vaporising vessel, a jacket surrounding the vaporising vessel, a conduit branching off from the heating medium piping behind the valve for supplying a branch current of heating medium to the jacket, a piping for supplying a branch current of the heating air to the jacket, a discharge pipe extending from the jacket into the atmosphere, means for automatically varying the cooling of the vaporising vessel by the air in dependence upon the temperature of the car, and an overpressure flap in the piping supplying heating medium to the air heater behind the branching point of the branch pipe supplying heating medium to the jacket.

14. A device for the automatic regulation of the supply of steam to an air heater provided with a condensate discharge in air-heating plant for a railway car, comprising a valve in the piping supplying steam to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, means for automatically varying the cooling of the vaporising vessel by the air in dependence upon the temperature of the car, a throttle in the condensate discharge pipe of the air heater, and a conduit branching off from the condensate discharge pipe before the throttle and extending to the jacket.

15. A device for the automatic regulation of the supply of steam to an air heater provided with a condensate discharge in air-heating plant for a railway car, comprising a valve in the piping supplying steam to the air heater, a thermal relay for controlling the valve, said relay comprising in combination a spring body for actuating the valve, a vaporising vessel, combined with the spring body, a vaporising liquid in the vaporising vessel, means for supplying a constant quantity of heat to the vaporising vessel, a jacket surrounding the vaporising vessel, a feed pipe for supplying a branch current of the heating air to the jacket, a discharge pipe extending from the jacket into the atmosphere, means for automatically varying the cooling of the vaporising vessel by the air in dependence upon the temperature of the car, an overflow vessel into which the condensate discharge pipe opens and a conduit extending to the jacket and branching off from the condensate discharge pipe before opening into the overflow vessel.

FRIEDRICH von SCHÜTZ.
BRUNO VOGÉE.